Dec. 16, 1924.
C. A. HANSON
SAW SET
Filed June 19, 1923
1,519,450
3 Sheets-Sheet 1
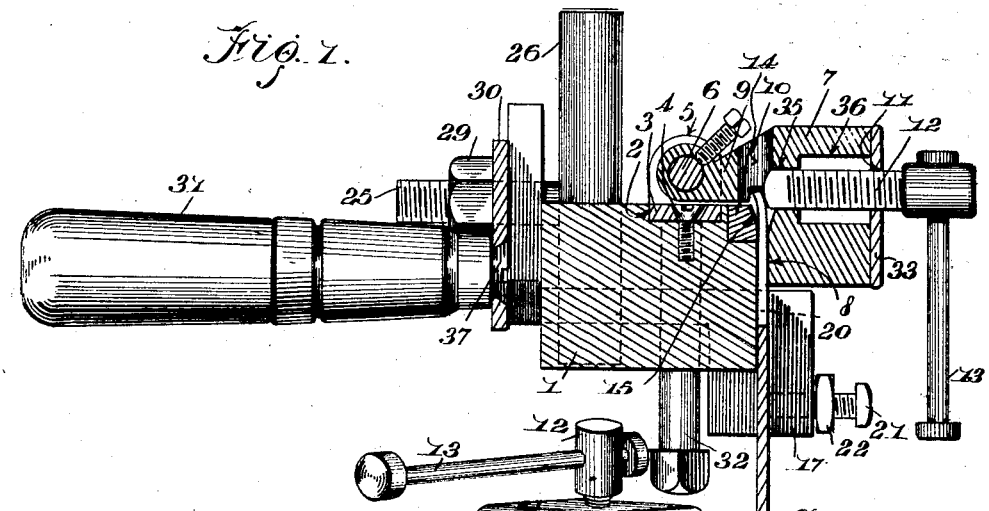
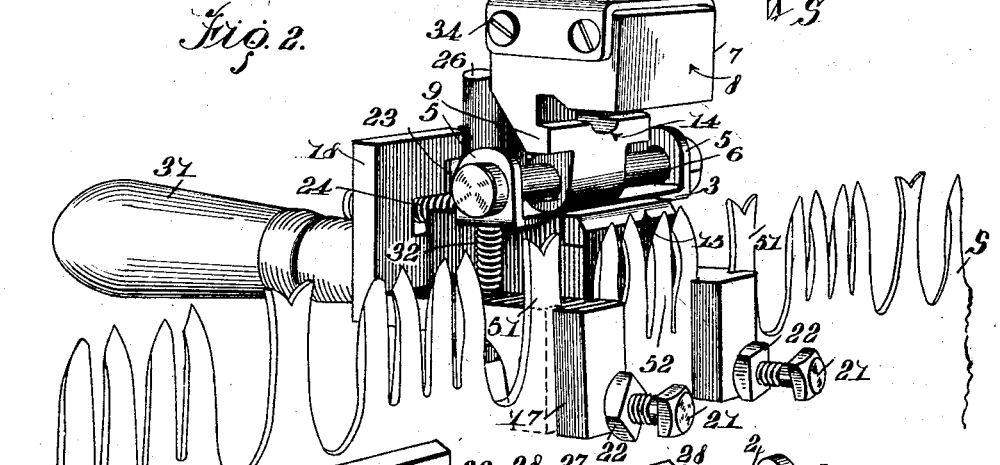
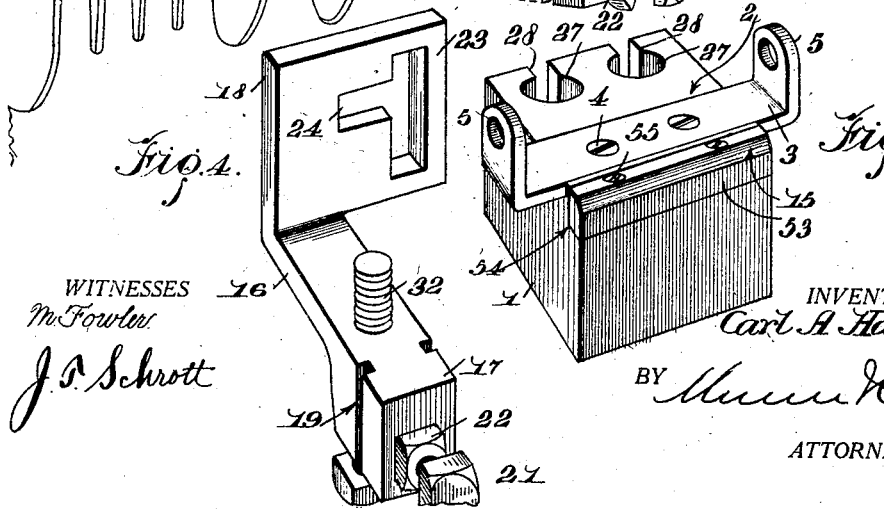
WITNESSES
M. Fowler
J. P. Schrott
INVENTOR
Carl A. Hanson
BY
ATTORNEYS

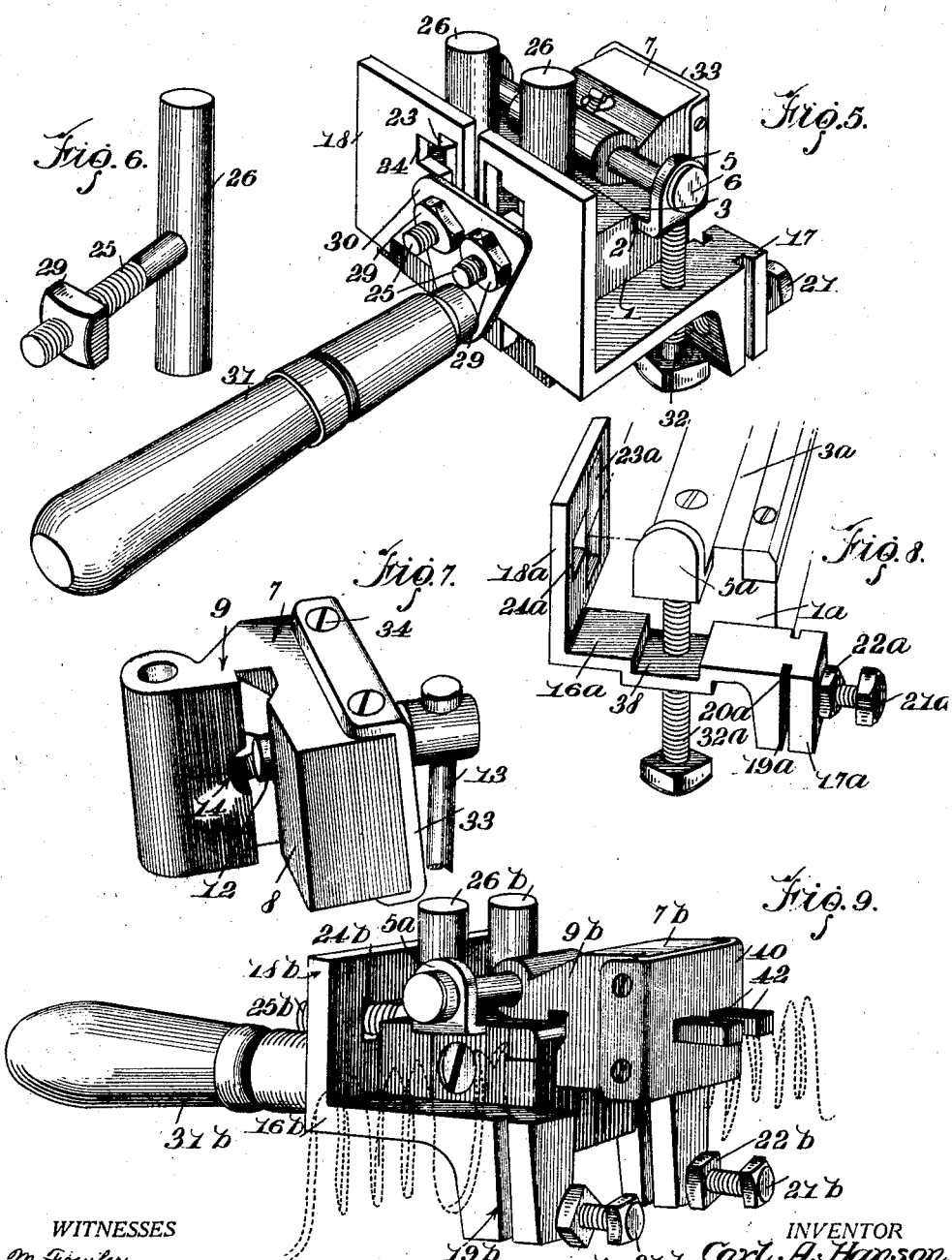

Dec. 16, 1924.
C. A. HANSON
SAW SET
Filed June 19, 1923
1,519,450
3 Sheets-Sheet 3
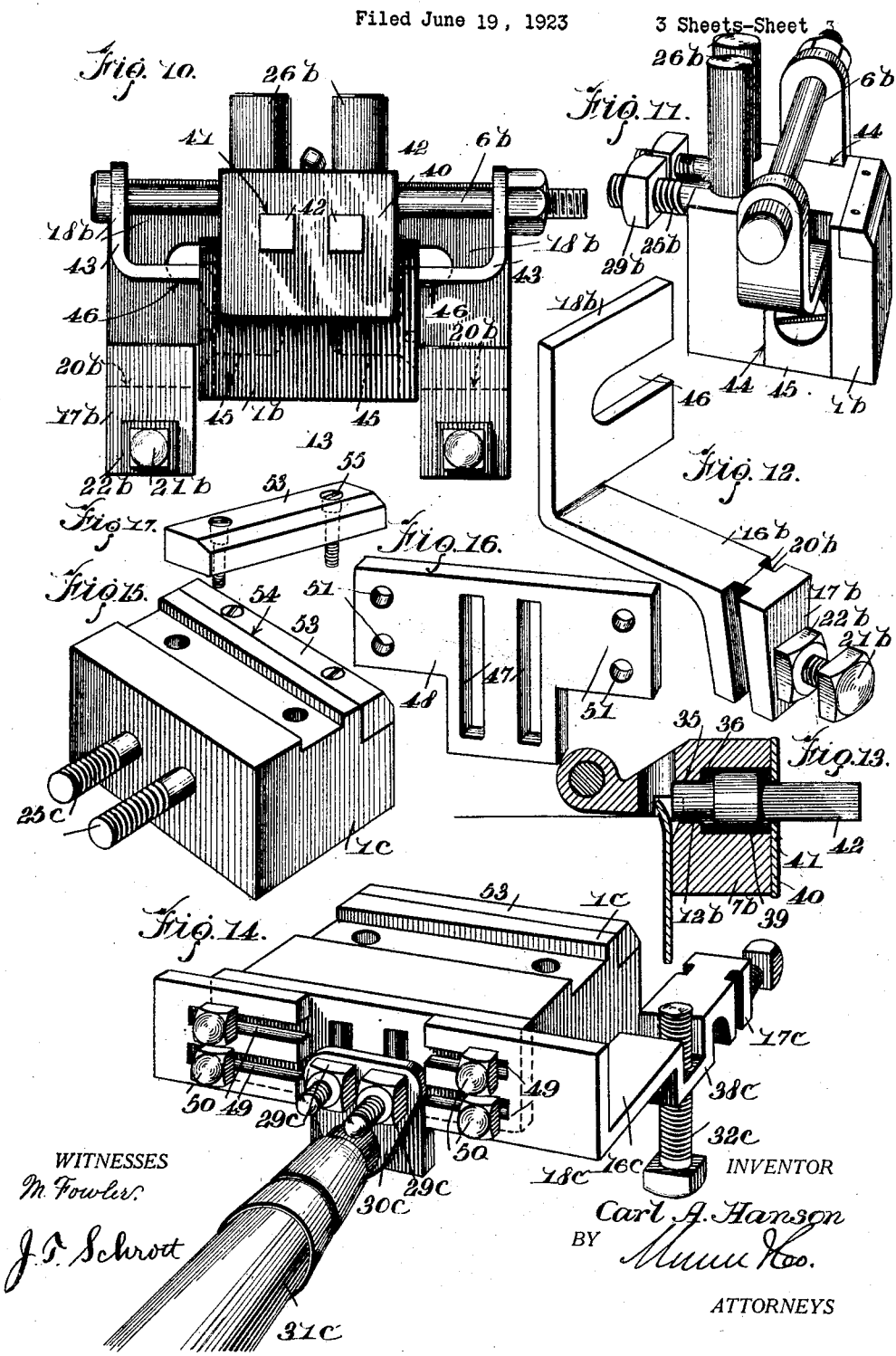
WITNESSES
M. Fowler.
J. F. Schrott
INVENTOR
Carl A. Hanson
BY
Munn & Co.
ATTORNEYS Patented Dec. 16, 1924.

1,519,450

UNITED STATES PATENT OFFICE.

CARL A. HANSON, OF PORTLAND, OREGON.

SAW SET.

Application filed June 19, 1923. Serial No. 646,358.

*To all whom it may concern:*

Be it known that I, CARL A. HANSON, a citizen of the United States, and a resident of Portland, in the county of Multnomah and State of Oregon, have invented certain new and useful Improvements in Saw Sets, of which the following is a specification.

My invention relates to improvements in saw sets, and it consists of the constructions, combinations and arrangements herein described and claimed.

An object of the invention is to provide a saw set adapted for rapidly setting the teeth of a saw either by means of screw or hammer pressure, provision being made for adjustments to accommodate various sizes of saw teeth.

A further object of the invention is to provide a saw set in which the setting elements (a screw or sliding pin) are carried by the anvil which in itself is adapted to be adjusted to accommodate various sizes of teeth.

A further object of the invention is to provide a dependable saw set which can be relied upon to so set the teeth of a saw, that subsequent testing for accuracy need not be done.

A further object of the invention is to provide a saw set in which the clamp plate can be adjusted laterally in respect to the anvil when it is necessary to set a saw in which the teeth are unusually far apart.

A further object of the invention is to provide a saw set which is so arranged that a number of teeth may be set in one position of the implement.

Other objects and advantages will appear in the following specification, reference being had to the accompanying drawings, in which:—

Fig. 1 is a longitudinal section of the improved saw set, showing it in use.

Fig. 2 is a perspective view showing the saw set of Fig. 1 in place on a saw, the setting block being raised, Fig. 3 is a detail perspective view of the anvil, Fig. 4 is a detail perspective view of one of the clamp arms, Fig. 5 is a perspective view of the saw set of Fig. 1, showing how it appears from the rear, Fig. 6 is a detail perspective view of one of the T bolts, Fig. 7 is a detail and partly inverted perspective view of the setting block showing the clearance behind the set screw.

Fig. 8 is a detail perspective view illustrating a modification in the clamp arms in the nature of a depression which permits low adjustments of the anvil to accommodate short saw teeth, Fig. 9 is a perspective view of a modification of the saw set wherein striking pins are used instead of a setting screw, Fig. 10 is a front elevation of the saw set in Fig. 9 illustrating the room for up and down adjustments of the anvil between the clamp arms, Fig. 11 is a detail perspective view of the anvil and certain carried parts of the saw set in Fig. 9, Fig. 12 is a detail perspective view of one of the clamp arms, Fig. 13 is a detail section taken substantially on the line 13—13 of Fig. 10 showing how the setting pin sets the saw tooth against the anvil, Fig. 14 is a perspective view of a further modification of the saw set embodying some of the principles of the foregoing modifications, Fig. 15 is a perspective view of the form of anvil in the saw set of Fig. 14, Fig. 16 is a perspective view of the mounting plate used in connection with Fig. 14, and Fig. 17 is a detail perspective view of the steel insert used in connection with the anvils in the several forms of the invention.

The modification in Figs. 1 to 7 illustrates one of the several modifications of the saw set, one of these as shown in Fig. 9 being characterized by having setting members consisting of slidable pins which are adapted to be struck with a hammer, thereby distinguishing from the form in Figs. 1 to 7 in which the setting member consists of a set screw. In principle, all of the modifications are identical.

Reference is made to Fig. 1. The anvil 1 has a groove 2 in which a bracket 3 is fitted and secured by means of screws 4. This bracket has upstanding ears 5 through which a bolt 6 is passed. This bolt furnishes a pivot or hinge upon which the setting block 7 is adapted to swing from the operative or setting position in Fig. 1 to the inoperative position in Fig. 2.

The setting block 7 is adapted to be moved to the position in Fig. 2 during the act of placing the saw set in position on the saw S. After the saw set is in position, the block 7 is swung down until the shoulder 8 rests against the side of the saw teeth. The shoulder 8 is offset from the shank 9 which forms the connection between the pivotal part of the block and the main body of the block itself. A hole 10 traverses the shank 9, and disposed at right angles to this hole is a covering plate 33 having a threaded opening 11 in which the setting screw 12 operates.

A handle 13 may be furnished to facilitate turning the screw 12. The screw may be turned by other means, if desired, for example, the end may be made in the shape of a bolt head. However, it would seem that the handle 13 is the most effective, making the turning of the setting screw 12 by hand easier. The end of the setting screw appears at the place of the hole 12. A clearance 14 provides means for the swaging of the saw tooth over the beveled edge 15 of a steel insert 53 of the anvil 1. The setting of the tooth is accomplished by turning the screw 12 against the saw tooth as shown in Fig. 1. The steel insert 53 occupies a rabbet 54 on the front edge of the anvil 1, where it is fastened in place by machine screws 55. This insert is used in all other forms of the invention. A detail of the insert is shown in Fig. 17, corresponding characters referring to parts already described.

Clamp arms 16 are necessary in obtaining a definite position of the saw set on the saw blade. One of these is shown in detail in Fig. 4. Each terminates in rests 17 at the front and clamp plates 18 at the back. The former is grooved around the sides and bottom at 19 so as to permit setting the rests over adjacent teeth, as shown in Fig. 2. A bridge 20 connects the outer part of each rest with the adjacent clamp arm 16. This bridge is adapted to engage the valley between the aforesaid adjacent teeth and so fix the position of the saw set.

Bolts 21 are adapted to be adjusted inwardly in respect to the rests so as to accommodate for any differences in thicknesses of saw blades and thereby take up any otherwise lost motion. The adjustment of the bolts 21 are set by jam nuts 22. The clamp plate (Fig. 4) has slots 23 and 24 which respectively run up and down and crosswise. The two slots communicate, as shown. They are intended to receive the clamp bolts 25 of one of the two T bolts which are carried by the anvil 1. The clamp bolt 25 is one of the parts of the aforesaid T bolts. Each T bolt includes a clamp rod 26. The clamp rod of each bolt is fitted in a corresponding opening 27 in the anvil (Fig. 3) each opening having a slot 28 which furnishes communication with the rear side of the anvil. The clamp bolt 25 is adapted to move up and down in the slot 28 when adjustments are made.

These adjustments are fixed by means of nuts 29 on the clamp bolts 25. As just stated, the clamp bolts pass through the slot 28 of the clamp plate 18, and they also pass through openings in a triangular plate 30 which may be said to be part of the handle 31. Upon unloosening the nuts 29, the pressure of the clamp rods 26 against the rear parts of the opening 27 and consequent pressure of the anvil 1 against the plates 18 is relieved so that up and down adjustments of the anvil 1 in respect to the clamp rods 26 may be accomplished. The clamp bolts 25 have passage in the vertical slots 23 during such adjustments. Lateral and inward adjustments of the clamp arms 16 are effected by bringing the horizontal slots 24 into use.

Both vertical and lateral adjustments of the anvil 1 and clamp arms 16 respectively, are made necessary by various kinds of saws. In some saws the teeth may be farther apart than in others, that is to say, a pair of valleys (Fig. 2) may not be in a convenient position for a particular adjustment of the saw set. In such an event, a lateral adjustment of the clamp arms 16 will be necessary. This is where the horizontal slots 24 come into use. Again, some saw teeth may be higher or lower than others. In such cases, vertical adjustments of the anvil 1 in respect to the bridges 20 of the rests 17 will be necessary.

Full dependence for the adjusting of the anvil 1 is not put on the T bolt and nuts 29. It is to be observed that the ends of the bracket 3 extend beyond the sides of the anvil 1 at least sufficiently far to cross the clamp arms 16. Each clamp arm is furnished with a bolt 32, the head of which is situated underneath, so that up and down adjustments may more readily be made. The ends of these bolts bear against the undersides of the extended bracket ends and thereby serve to distribute the supporting elements in such a manner that the anvil will be held in place quite firmly. In fact, upon unloosening the clamp nuts 29, the necessary up and down adjustments of the anvil may be made by means of the bolts 32, whereupon the clamp nuts 29 are again tightened according to the new adjustment.

The cover plate 33 to which reference has been made before, is fitted across the front of the setting block 7 and has flanges through which screws 34 (Fig. 2) are passed in order to secure the plate in position. The interior of the setting block has openings of two diameters, the smaller one of these 35 being adapted to receive the end of the setting screw 12. The larger of these 36 is not utilized in the present instance but only in cases where a slidable pin, such as shown in Fig. 13, is used. The handle 31 is secured to the triangular plate 30 by means of a screw 37 which is fitted in place from the inside (Fig. 1).

The modification in Fig. 8 consists mainly in making a depression 38 in each of the clamp arms 16. A set bolt 32ª is carried by each clamp arm, but in the present instance, is situated in the depression instead of in the arm proper, as, for example, in Fig. 4. The purpose of this arrangement is to allow extreme downward adjustment of the anvil 1ª so that saws having very short teeth may be accommodated. In its other respects, the clamp arm 16ª is identical with the one shown in Fig. 4, the identity of parts being indicated by corresponding reference characters which differ only by the addition of the exponent a.

The modification in Figs. 9 to 13 illustrates a form of the saw set wherein the use of striking setting pins is made, instead of the setting screw in the first modification. The striking pin 12ᵇ (Fig. 13) is slidable in the opening 35 of smaller diameter which is described in connection with Fig. 1. The opening 36 of larger diameter is occupied by a collar 39 which is intended to limit the sliding motion of the setting pin. This motion is limited by the shoulder which is formed adjacent to the opening 35 and the cover plate 40. This plate has its equivalent in the plate 33 in Fig. 1, but instead of having a threaded opening 11, now has a non-circular opening 41 to receive the correspondingly non-circular shank 42 of the setting pin. In fact, there are two non-circular openings in the cover plate 40 (Fig. 10), because this particular modification contemplates the use of two setting pins. However, only one setting pin may be used when desired, and for this purpose, the provision of two setting blocks 7ᵇ may be made, one to accommodate double setting pins, the other to accommodate only one setting pin. The two may be interchanged as conditions may require.

Instead of the bolt 6ᵇ being supported by a single bracket, as for example in Fig. 3, it is now supported by a pair of brackets 43 (Figs. 10 and 11), certain bent ends of which are fitted in vertical grooves 44 on opposite sides of the anvil 1ᵇ. Single screws 45 serve to hold the bracket 43 in place, the engagement of the side edges of the bracket with the sides of the grooves, preventing turning of the bracket.

Other parts of the saw set now under consideration are identical with similar parts in the first modification, the corresponding reference characters differing only by the addition of the exponent letter b. There is one other exception to this statement, and this exception refers to the clamp arms 16ᵇ, one of which is shown in detail in Fig. 12. The set bolt 32 (Fig. 4) is here omitted, and in place of having the double slot arrangement in the clamp plate 18ᵇ, only a single slot 46 is employed. This slot furnishes an outlet for the adjacent clamp bolt 25ᵇ, the nut 29ᵇ performing the same clamping function against this plate as does the nut 29 in Fig. 1.

The modification in Figs. 14 to 16 illustrates the use of an anvil 1ᶜ (Fig. 15) in which the clamp bolts 25ᶜ are permanently set instead of being carried as part of a T bolt, as shown in Fig. 1. These fixed clamp bolts are intended to cooperate with the parallel slots 47 of a mounting plate 48 (Fig. 15). This plate is clamped in position at the back of the anvil 1ᶜ by the nuts 29ᶜ which are applied to the ends of the bolts 25ᶜ. These nuts bear against the triangular plate 30ᶜ of the handle 31ᶜ. The nuts perform the function of holding both the plates 48 and 30ᶜ in position. By unloosening the nuts, the plate 48 may be adjusted up or down in respect to the anvil 1ᶜ and handle 31ᶜ.

This up and down adjustment may affect the clamp arms 16ᶜ inasmuch as they are carried by the plate 48. The clamp plate 18ᶜ of each arm has pairs of parallel slots 49 through which the shanks of bolts 50 pass in order to secure the clamp plates to the lateral extensions of the mounting plate 48. These extensions have threaded holes 51 to receive the bolts. The bolts do not extend into the anvil 1ᶜ.

The reader can now doubtless readily understand that the aforesaid up and down adjustments of the plate 48 carry the clamp arms 16ᶜ with them so that the relative positions of the rests 17ᶜ and the anvil 1ᶜ are changed. As before, these relative adjustments are intended to take care of various lengths of saw teeth. The visible clamp arm 16ᶜ in Fig. 14 has a depression 38ᶜ, as is the case in Fig. 8, but it is optional whether this particular style or the style of clamp arm in Fig. 12 is employed. As stated before, the former permits even lower adjustments of the anvil than does the straight style in Fig. 12, and this has its advantages when setting saws which have very short teeth. The depression 38ᶜ carries a setting bolt 32ᶜ as in the forms of the invention in Figs. 5 and 8.

The operation, although doubtless readily understood from the drawings and the foregoing description, may be briefly reviewed to advantage. Referring to Fig. 2: The saw set is first set upon the saw S by inserting the rests 17 between certain teeth which are designated 51. In the present instance four teeth 52 are situated between these teeth. Two of these must be set in one direction, the other two in the opposite direction. The bolts 21 are adjusted and set at such places as will permit the ready application of the saw set to the blade yet not permit such loose play as might spoil the proper setting of the saw teeth.

It is presumed that this adjustment is made beforehand. The vertical adjustment of the anvil 1 is also made beforehand. This adjustment is accomplished by turning the bolts 32 up or down. These bolts bear beneath the extensions of the bracket plate 3 and so serve to raise the anvil and on the other hand limit the downward adjustment as when the bolts 32 are screwed away from the bracket plate. It is necessary to unloosen the clamp nuts 29 on the back of the triangular plate 30 before any adjustment of the anvil can be made. Unloosening these nuts also releases the grip of the clamp rods 26 on the back parts of the openings 27 (Fig. 3) of the anvil 1.

Assuming all necessary adjustments to have been made, the saw set is applied as shown in Fig. 2. The operator should hold the setting block 7 up in the position shown while applying the saw set. The setting block is then swung down so that the setting screw 12 comes opposite one of the teeth 52 which must be set toward the anvil 1. The opening 10 serves as a sight through which the operator may observe whether the screw 12 is in proper registration with the tooth in question. The setting is accomplished by turning down on the screw 12 by means of the handle 13. The other tooth is next set by sliding the block 12 along the rod 6.

All teeth of the same inclination are set before turning the saw set around to set the companion teeth of opposite inclination. But in any case, it is possible to set two teeth 52 without changing a particular position of the saw set. In Fig. 2, the setting block 7 must be moved into two positions along the rod 6 in order to reach the two teeth which incline toward the invil 1. This is not the case when using the striker pin saw set of Figs. 9 and 10. Here the pins 42 are in the correct position to reach the respective teeth and a hammer blow on the end of each will accomplish the purpose. This style of saw set may be made with only one setting pin if desired. In such event, the only difference in construction will be in the setting block 7ᵇ.

While the construction and arrangement of the improved saw set as herein described and claimed, is that of a generally preferred form, obviously modifications other than those disclosed, may be made without departing from the spirit of the invention or the scope of the claims.

I claim:—

1. A saw set comprising an anvil, arms having rests by means of which contact is made with a saw to support the anvil in a desired position in respect to the teeth, a setting member to cooperate with the anvil, a block which carries the setting member, a bar upon which the block is both swingable and slidable to respectively permit the application of the saw set and the lateral movement of the setting member in respect to the teeth, and a bracket carried by the anvil on which the rod is mounted.

2. A saw set comprising an anvil, arms having rests by means of which contact is made with a saw to support the anvil in a desired position in respect to the teeth, a setting member to cooperate with the anvil, a block which carries the setting member, a bar upon which the block is both swingable and slidable to respectively permit the application of the saw set and the lateral movement of the setting member in respect to the teeth, a bracket carried by the anvil on which the rod is mounted, and means carried by the arms for effecting up and down adjustments of the anvil and its carried parts in respect to said arms and the saw.

3. A saw set comprising an anvil, arms having rests by means of which contact is made with a saw to support the anvil in a desired position in respect to the teeth, a setting member to cooperate with the anvil, a block which carries the setting member, a bar upon which the block is both swingable and slidable to respectively permit the application of the saw set and the lateral movement of the setting member in respect to the teeth, a bracket carried by the anvil on which the rod is mounted, means carried by the arms for effecting up and down adjustments of the anvil and its carried parts in respect to said arms and the saw, and means associated with said arms for fixing the anvil at the various adjusted positions.

4. A saw set comprising a pair of arms having rests adapted to engage a saw blade, an anvil situated between the arms and adapted to be supported adjacent to the teeth, a setting member, a block hinged and slidable on the anvil, and clamp means for fixing the anvil in respect to the arms comprising a handle which includes a plate, clamp bolts extending from the anvil and passing through said plate, and clamp nuts carried by said bolt adapted to effect a tightening by which the anvil is held in position.

5. A saw set comprising a pair of clamp arms having rests adapted to contact a saw between the teeth, a clamp plate on each arm, an anvil disposed between the arms, a setting member for setting the teeth against the anvil, a block carrying the setting member, means to support the block on the anvil, a handle having a plate, and means carried by the anvil passing through both the clamp and handle plates including means to bind said parts together so as to fix adjusted positions of the anvil in respect to said arms.

6. A saw set comprising an anvil, arms at the sides of the anvil having slotted clamp plates situated in back and rests adapted to contact a saw blade situated in front, a handle having a plate engaging the back of said clamp plates, and clamp means to bind the anvil against clamp plates including bolts carried by the anvil passing through the slots of said clamp plates and through the handle plates, and nuts carried by said bolts adapted to be tightened against the handle plate, the slots in said clamp plates running in two directions to permit up and down adjustment of the anvil and lateral adjustment of said arms.

7. A saw set comprising a pair of arms having slotted clamp plates, and saw blade rests at opposite ends, an anvil situated between the arms and contacting the clamp plates, a handle having a plate contacting the opposite sides of said plates, and T bolts carried by the anvil in loose contact including clamp bolts passing through said plates and provided with nuts to tighten against the handle plate and bind the anvil in position against said clamp plates.

8. A saw set comprising a pair of arms having clamp plates and saw blade rests at opposite ends, an anvil situated between the arms in contact with said plates and having openings with vertical slots opening toward said plates, a handle having a plate contacting the rear of the clamp plates, a clamp rod situated in each of the anvil openings, a clamp bolt carried by each rod adapted to occupy said slot and pass through both the clamp and handle plates, and nuts on said bolts engaging the handle plate and being adapted to secure the anvil in various adjusted positions relative to said arms.

9. A saw set having clamp arms, rests in which each arm terminates, each rest having a slotted part adapted to receive a portion of a saw blade said parts being connected by a bridge adapted to contact the valley between predetemined teeth, and means carried by a part of each rest adapted for adjustment to take up loose play occasioned by various thicknesses of saw blades.

10. A saw set having clamp arms, rests in which each arm terminates each rest having a slotted part adapted to receive a portion of a saw blade said parts being connected by a bridge adapted to contact the valley between predetermined teeth, means carried by a part of each rest adapted for adjustment to take up loose play occasioned by various thicknesses of saw blades, and means to fix the adjusted positions of said means.

11. A saw set having a setting block with communicating openings of two diameters, a setting member carried by the block having an end resting in the smaller opening, and a cover plate over the larger opening, said plate being fastened to the block, furnishing a support in which the other end of the setting member is mounted.

12. A saw set having a setting block with communicating openings of two diameters, a cover plate fixed on the setting block and having a non-circular opening communicating with the larger one of said openings, and a setting pin carried by the block including a portion occupying the small opening, a collar occupying the larger opening in which it has limited movement, and a non-circular portion extending through said cover plate.

13. A saw set having an anvil with a groove, a setting block carrying a setting member, a rod upon which the block is mounted to swing up and down or to slide laterally in respect to the anvil, and a bracket mounted in the groove furnishing a support for said rod.

14. A saw set comprising an anvil, clamp bolts projecting therefrom, a handle having a plate, a mounting plate having slots through which said bolts pass to reach the handle plate, nuts on said bolts to fasten the plates together and against the anvil, arms situated at the sides of the anvil, a clamp plate carried by each arm having slots, and bolts passing through said slots into the mounting plate permitting lateral adjustments of the arms, the slots in the mounting plate permitting vertical adjustments of the anvil in respect to the arms.

15. A saw set comprising an anvil, a bracket carried by the anvil, a setting block having a setting member supported by said bracket, a rod upon which the block is mounted in said bracket, arms situated at the side of the anvil, each having a depression adapted to receive the ends of the brackets, and a set bolt in each depression by means of which relative adjustments are effected.

CARL A. HANSON.